United States Patent [19]

Elliott

[11] 4,045,922
[45] Sept. 6, 1977

[54] INSULATIVE ROOF APPARATUS FOR MOBILE HOMES AND THE LIKE

[76] Inventor: Frank S. Elliott, 4815 N. 63rd Drive, Phoenix, Ariz. 85033

[21] Appl. No.: 700,324

[22] Filed: June 28, 1976

[51] Int. Cl.² .............................................. E04B 7/00
[52] U.S. Cl. ......................................... 52/94; 52/408
[58] Field of Search ................ 52/309, 408, 410, 411, 52/409, 622, 94, 58, 515

[56] References Cited

U.S. PATENT DOCUMENTS

| 2,345,221 | 3/1944 | Swenson | 52/409 |
| 2,861,525 | 11/1958 | Curtis et al. | 52/515 X |
| 3,307,306 | 3/1967 | Oliver | 52/409 X |
| 3,404,495 | 10/1968 | Simpson, Jr. | 52/58 |

FOREIGN PATENT DOCUMENTS 1,015,705   1/1966   United Kingdom .................. 52/409

Primary Examiner—Ernest R. Purser
Assistant Examiner—Carl D. Friedman
Attorney, Agent, or Firm—H. Gordon Shields

[57] ABSTRACT

Roof apparatus is disclosed for mobile homes and the like which includes several discrete layers of different types of materials, including insulation materials, bonding materials, and sealing materials, which together provide insulation from heat and cold from the mobile home structure and the structural strength requirements for minimizing damage to the mobile home by normal flexing of the mobile home, such as resulting from wind.

4 Claims, 5 Drawing Figures

INSULATIVE ROOF APPARATUS FOR MOBILE HOMES AND THE LIKE

BACKGROUND OF THE INVENTION

1. Field of the Invention

This invention relates to roof apparatus, and, more particularly, to insulative roof apparatus for mobile homes and similar type structures.

2. Description of the Prior Art

Mobile homes, and other similar structures which are relatively light weight and not secured to a permanent, fixed foundation, but rather are designed for movement from place to place are typically built of material substantially lighter in weight than homes and buildings erected on a permanent, fixed site. Accordingly, the structure will generally move or sway in transit and on a site. The degree of movement depends on several factors, including the wind velocity to which the structure is subjected and the degree of rigidity imparted to the structure by various types of tie-down devices.

A typical roof structure for such apparatus simply includes only a limited amount of insulation beneath a thin sheet metal or composition roof. A urethane coating is sometimes used on top of the sheet metal. The roof itself is secured to wooden trusses which extend between the side walls. The ceiling for the mobile home is secured to the bottom of the trusses and to rafters which also extend between the walls. The metal or composition roof is secured to the top of the trusses. The height of the trusses provides for a small attic space in which duct work extends. Insulation is placed in the attic between the rafters and trusses.

The efficiency of such roof as an insulator is relatively low, and the roof may be subjected to deterioration in the insulation and even in the integrity of the roof due to movement of the roof. The movement of the roof, as the result of relative wind, must be relatively flexible. However, the roof should also provide substantial insulation to both heat and cold. If insulation is secured to the roof, the insulation must be flexible enough to withstand the normal movement of the roof structure. To accomplish the desirable objectives of roof insulation, an insulative layer of some type of urethane has been used in the prior art. However, urethane has several undesirable properties, such as cracking due to either movement of the roof or weight imposed on the urethane, as by individuals walking on the roof, and, in case of fire, urethane gives off toxic fumes. These two undesirable properties, cracking and toxicity of fumes, limit the usefulness of urethane even though it is a relatively good insulator.

The roof apparatus of the present invention overcomes the deficiencies and problems of the prior art by providing a flexible roof which allows the structure to move normally without destroying the integrity of the insulative roof, provides good insulation for the structure, and is relatively simple to install and relatively inexpensive. The roof apparatus of the present invention also eliminates the need for insulation in the attic area of mobile homes.

SUMMARY OF THE INVENTION

The roof apparatus of the present invention comprises the installation of several types of elements, such as a fiberglass type insulation with a layer of foil secured thereto, a mesh which provides structural integrity for a sealing layer, metal bands to hold the roof structure in place, and a peripheral metal strip which secures the roof apparatus to the mobile home structure. Elastomeric rubber resin, which is flexible, is also used about the periphery of roof members which extend upwardly from the roof, such as vents and roof mounted coolers or air conditioning units, and beneath the peripheral metal strip.

Among the objects of the present invention are the following:

To provide new and useful roof apparatus for mobile homes;

To provide new and useful insulation for a mobile home;

To provide new and useful roof apparatus comprising a plurality of layers of different materials which complement the qualities or attributes of the various layers;

To provide new and useful roof apparatus including a peripheral strip of metal about a roof;

To provide new and useful roof apparatus that is flexible and which will yield to roof movements without breaking or destroying the integrity of the roof; and To provide new and useful roof apparatus which retains its structural and insulative integrity while allowing the roof to remain flexible.

BRIEF DESCRIPTION OF THE DRAWING

FIG. 1 is an isometric view of a mobile home 2 which includes roof apparatus 10 of the present invention. The roof comprises a typical mobile home roof structure, as modified with several layers of insulative materials secured together at the outer peripheries of the roof of the apparatus.

Figure 1:
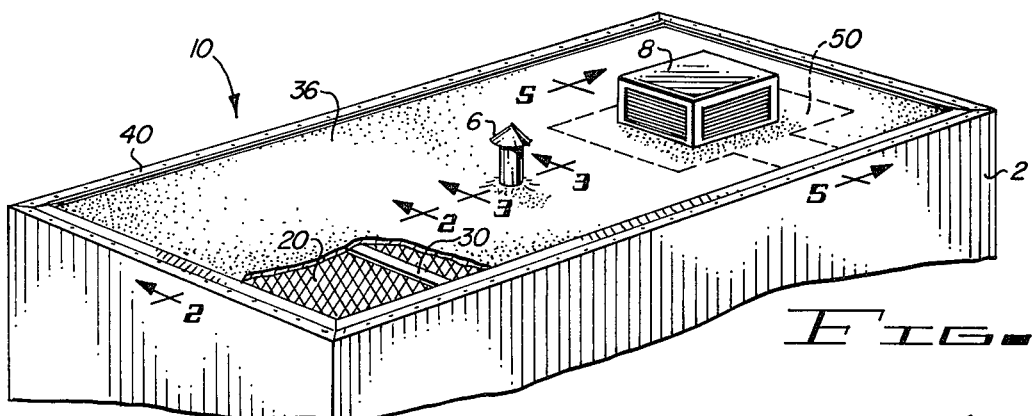
FIG. 1 is an isometric view of a mobile home.

The roof apparatus 10 includes a layer of mesh 20 over a layer of foil-back insulation, which is well-known in the trade, and which comprises the first insulative layer disposed directly on the structural top of the roof. The structural portion of a mobile home roof typically includes wooden trusses extending across the width of the mobile home and spaced apart from each other. The trusses then support a layer of sheet metal or a composition roof. Beneath the roof, sheet metal or composition, and beneath the wooden trusses and rafters, a layer of fiberglass type insulation is the primary, if not the only, insulation in the roof of a mobile home of the prior art. With the roof apparatus of the present invention, such insulative material may be eliminated.

In the roof apparatus 10 of the present invention, a layer of foilback insulation, typically 3 or 4 inches thick, is first disposed on top of the structural roof of a mobile home. The structural roof comprises a base for the insulative roof apparatus 10. A layer of woven mesh 20 is laid over the entire roof on top of, or in contact with, the layer of foil (see FIGS. 2, 3, and 4 below). A plurality of spaced apart metal bands 30 then extend across the building from side to side and are secured to the structural members of the building. The bands provide structural strength in holding the roof apparatus together on the mobile home building. For example, in high winds, the use of the metal bands will help to prevent the roof of the mobile home from coming off.

About the periphery of the trailer is a strip 40 of edging material which is disposed on top of, and accordingly secures, the mesh and the foilback insulative layer, and the metal bands, to the outer peripheral structural members of the mobile home. The edge strip 40 is illustrated in detail in FIGS. 2 and 4 below. The strip is preferably secured to the structural frame members of the mobile home by a plurality of fasteners, such as screws.

After the edge strip 40 is secured to the outer periphery of the roof, a layer of sealer overcoat 36, preferably a vapor weather barrier sealer, is then placed over the entire roof. The sealer overcoat is normally a liquid when applied and accordingly may be rollered or sprayed onto the roof. The sealer 36 penetrates the layer of mesh 20 and accordingly is securely bonded to the roof, using the layer of mesh as a lattice framework to which it may adhere and through which it may penetrate. The sealer overcoat is preferably light in color to reflect the solar radiation impinging on the roof.

Shown extending upwardly from the roof of the mobile home 2 is a vent 6. The vent extends upwardly through the roof and is typically made of galvanized steel.

Also shown on the roof, and extending upwardly therefrom is a cooling unit 8. The sealer coat 36 is shown extending to the cooling unit 8, but immediately adjacent to the cooling unit and outlined in dashed lines, is a flexible layer of rubber resin 50 (see FIG. 5) which is a cellular insulation, disposed about the periphery of the cooler beneath the sealer and extending to the edge of the roof at a side wall of the mobile home 2. The rubber resin insulation 50 is disposed directly on the sheet metal roof of the mobile home and directly against the sides of the cooler 8, as illustrated below in FIG. 5. The foil backed insulation abuts against the rubber resin insulation and is accordingly spaced apart from the cooler. The rubber resin insulation bonds to both the sheet metal roof of the mobile home and also to the bottom portion of the cooler, and the mesh 20 is placed over the rubber resin insulation, just as it is placed over the foil back insulation. The seal coat is then placed on the entire roof structure.

The rubber resin insulation provides sufficient insulation beneath the seal coat to adequately insulate the roof and it also allows limited traffic on the roof without damage to the insulation. Accordingly, the insulation is disposed outwardly for a distance of about three feet to allow a workman to walk around the cooler and accordingly have access to the cooler to make any necessary repairs thereon. If the foil back insulation were disposed up to the cooler, damage to the insulation would result from traffic thereon. The rubber resin insulation replaces the foil back insulation adjacent the cooler and also at other locations on the roof at which traffic is anticipated.

Figure 4:
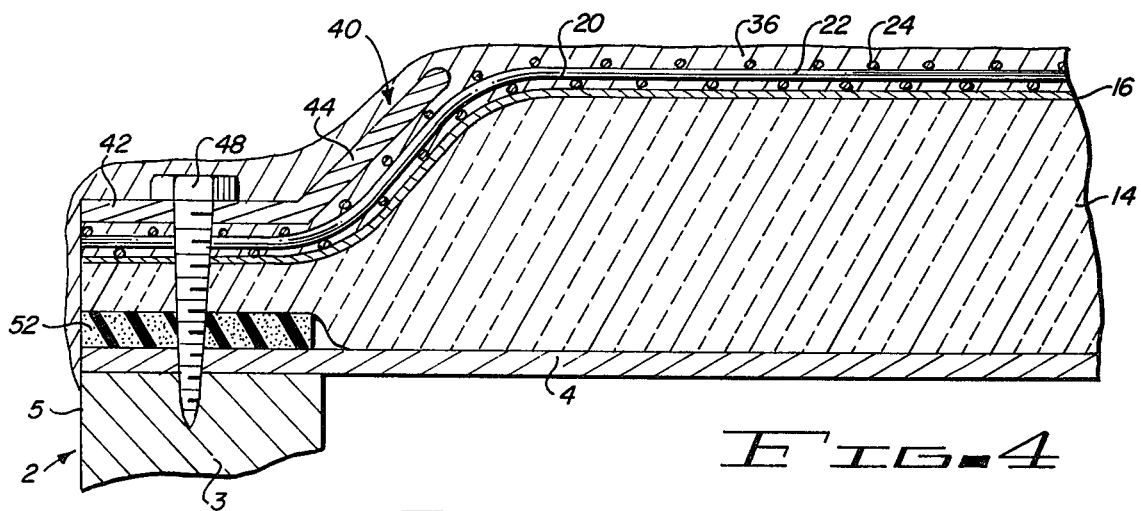
FIG. 4 is a partial section comprising an enlargement at the circle 4 of FIG. 2.

The edge strip 40 is shown in FIG. 1 at the outer periphery of the roof of the mobile home, with the sealer or overcoat 36 shown abutting against the edge strip. However, as is shown in FIG. 4, below, the sealer 36 actually is placed over the entire roof structure, including over the edge strip to properly and appropriately seal the entire roof.

Figure 2:
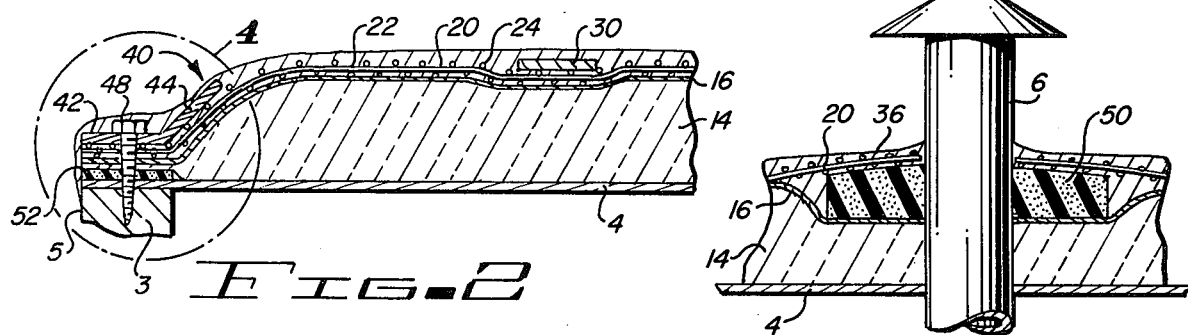
FIG. 2 is an enlarged view in partial section taken along lines 3—3 of FIG. 1.

FIG. 2 is an enlarged view in partial section of a portion of the roof apparatus 10 of the mobile home 2 shown in FIG. 1, taken generally along line 2—2 of FIG. 1. It comprises an enlarged view to illustrate the various layers of insulation on the mobile home 2.

The mobile home 2 includes a sheet metal roof layer 4 which is disposed beneath the insulation. The sheet metal 4 is appropriately secured to roof trusses or other roof structure of the mobile home, and the layers of insulation are disposed directly thereon. At the corner of the mobile home is shown a frame structure 3, which may be wood or metal. The frame structure 3 is simply a structural frame member which provide support for the mobile home. The sheet metal layer 4 is disposed on top of the structural member 3, and, as illustrated in FIG. 2, comprises the top roof skin of the mobile home. It is noted that the sheet metal 4 extends at least to outer wall 5, or to the juncture of the edge of roofing and the outer wall of the mobile home. If desired, the sheet metal roof may extend outwardly of the wall and may include a downwardly coving portion to provide a seal at the edge of the mobile home roof. That is, the coving may extend downwardly over the juncture of the roof and the outer wall of the mobile home. For illustrative purposes herein, the sheet metal is shown as extending only to the edge, and thus being flush with, the wall of the mobile home.

About the outer periphery of the roof of the mobile home is a flexible sealing gasket 52 of the rubber resin insulation 50. The edge gasket comprises a gasket to seal the edge of the insulation and the roof.

Directly on top of the sheet metal layer 4 and on top of the edge gasket 52 is the foil back insulation. The foil back insulation is disposed on the roof with a layer of fiberglass 14 disposed against the metal 4 and over and against the edge gasket 52. Remote from the metal roof 4, and thus above or on top of the fiberglass, is a thin layer of foil 16, which is typically secured to the fiberglass 14. Foil back insulation is well known in the art and is accordingly well understood.

On top of the foil back insulation layer is the mesh 20, shown in FIG. 2 as comprising warp threads 22 and woven woof threads 24. As discussed above, the mesh 20 is disposed over the entire roof, including about and adjacent to such roof protuberances as the vent 6 in the cooler 8 shown in FIG. 1.

A plurality of metal bands 30 are disposed transversely of the roof in a spaced apart arrangement. The metal bands extend from one side of the mobile home to the opposite side, in a parallel fashion. The bands extend across or transversely of the longitudinal axis of the mobile home to provide strength and stability to the roof to prevent the roof apparatus, as illustrated herein, from coming off the roof due to vibration, wind, or the like. Moreover, the metal bands also provide an extra amount of protection to the mobile home in tieing the side walls together and to the roof.

At the edge of the roof structure is placed that edge strip 40. The edge strip 40 includes two portions, an outer flange portion 42 which is disposed substantially parallel to the roof, and an inner upwardly extending flange 44. The upwardly extending flange 44 extends upwardly at about a 45° angle with respect to the horizontal, and inwardly toward the insulative roof, which is away from the edge of the wall 5. The edge strip 40 is placed on top of the foil back insulation and also on top of the mesh 20, with the flat outer flange 22 disposed over the edge gasket 52 and over the structural member 3 of wall 5. The edge strip 40 is secured to the roof structure by appropriate fastening means, such as a self-tapping screw 48 which extends through the insulative layers, including the edge gasket 52, and through the sheet metal roof 4 and into the mobile home structural member 3.

The seal coat 36 penetrates into the mesh 20 and also extends above the mesh, above the metal bands 30, and above and over the two flanges 42 and 44 of the edge strip 40. The seal coat also extends downwardly over the side edges of the roof to seal the edges of the roof, including downwardly over the juncture of the sheet metal layer 4 and the side 5 of the mobile home. Although the vertical height of the roof apparatus, or of the various layers and components which comprise the roof apparatus, may vary, the seal coat is put on in varying depths so as to provide a relatively smooth top surface for the roof apparatus.

Figure 3:
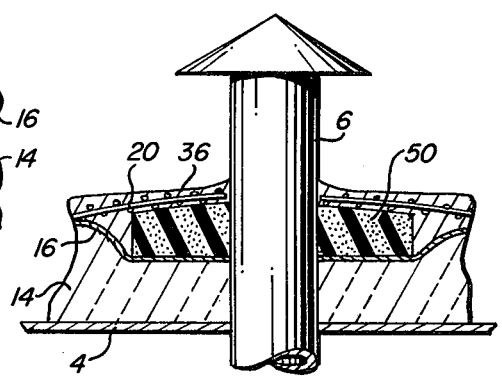

FIG. 3 is an enlarged view in partial section of a portion of the roof apparatus 10 of FIG. 1 taken generally along line 3—3 of FIG. 1. The enlarged view illustrates the procedure used, and the insulation layers employed, about an upwardly extending roof protuberance, such as the vent 6.

The vent 6 is shown extending downwardly through the sheet metal layer 4 of the mobile home. Above the sheet metal 4, and in abutting relationship with respect to the vent 6, is the fiberglass 14, with its layer of foil 16 on top of, or above the fiberglass layer, and remote from the layer of sheet metal 4. A collar or ring of rubber resin insulation 50 is placed on top of the foil and encircling and adjacent the exterior periphery of the vent 6. The rubber resin bonds to both the vent 6 and to the foil 16 of the foil back insulation. The rubber resin forms a donut-shaped gasket about the vent which seals the vent and also provides sealing for preventing moisture from penetrating to the fiberglass layer 14.

Above both the foil-back insulation and the rubber resin 50 is shown the mesh 20. Over the mesh 20, and interspersed within and beneath the mesh 20 is the sealer 36 which provides the seal coat for the roof insulation. The sealer or overcoat 36 is sprayed or rollered over the entire roof, adjacent the vent 6, over the rubber resin 50, and over the foil layer 16 and the mesh 20.

FIG. 4 is an enlarged view in partial section of a detail of the roof apparatus of the present invention, comprising an enlargement of the circle 4 of FIG. 2. The various layers of insulation are shown disposed on the sheet metal roof or skin 4. The fiberglass insulation layer 14 is shown placed directly on the sheet metal 4 and on top of the edge gasket 52 at the edge 5 of the mobile home 2. The foil layer 16 is, of course, secured to and on top of or above the fiberglass layer 14 and remote from the sheet metal 4. On top of the foil is the layer of mesh 20. As enlarged, the warp 22 and woof 24 threads are shown disposed on the foil with the sealer 36 disposed within and above the mesh or netting 20. The mesh extends all the way to the wall 5 above the foil.

Edge strip 40 is shown secured by a screw 48 to the roof structure, through the mesh 20, the foil and fiberglass through the edge gasket 52, into and through the sheet metal roof 4 and into the structural member 3 of the mobile home 2. The fiberglass layer 14 is shown substantially compressed at the edge and beneath the flange 42 due to the securing of the edge strip 40 by the screw 48. The inner flange 44 of the edge strip 40 is shown extending upwardly at about a 45° angle with respect to the roof, or about 135° away from the flat outer flange 42, which is disposed substantially parallel to the sheet metal roof 4.

The inner upwardly and extending flange 44 terminates at an outer edge 46 which is gently rounded so as to prevent a sharp edge from cutting the roof apparatus.

While the fiberglass layer 14 is shown compressed beneath the flange 42, the upwardly extending flange 44 allows the layer 14 to expand to its proper thickness.

Over the layers of insulation and also over the edge strip 40 is the sealer overcoat 36. The overcoat covers the entire structure and is also disposed downwardly along the edge of the insulation at the wall or edge 5 of the mobile home to substantially seal the entire roof structure, including the edge strip 40 and the edges of the gasket 52, the fiberglass 14 and the foil 16, and the mesh 20 beneath the flat outer flange 42.

Figure 5:
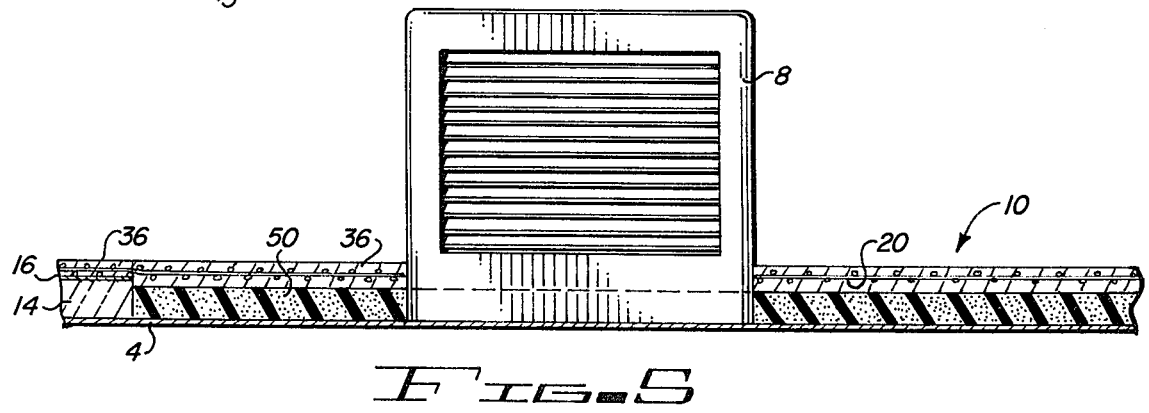
FIG. 5 is a partial section taken along lines 5—5 of FIG. 1.

FIG. 5 is a view in partial section of a portion of the apparatus of FIG. 1, taken generally along line 5—5 of FIG. 1. It illustrates the roofing apparatus of the present invention disposed about a relatively large structure, shown as the cooler 8, about which a worker may need to walk in order to service the cooler.

The cooler is appropriately disposed on the sheet metal roof 4. Supporting structure, ductwork, electrical connections, and the like, are not shown. Immediately adjacent the cooler 8 is a relatively thick layer of rubber resin insulation 50. The rubber resin insulation bonds to both the sheet metal 4 and the cooler 8, thus providing a seal about the periphery of the cooler and the roof. As indicated above, the layer of rubber resin 50 may be walked on without destroying either its ability to insulate or its capacity to seal. That is, there is no derogation in the insulative quality of the rubber resin 50 and there is no structural damage, such as cracking or pulling away from either the roof or the cooler, or any other physical deformity which would prevent the rubber resin from retaining its bonding and accordingly its sealing ability with both the sheet metal 4 of the roof and the cooler 8.

Spaced apart a distance away from the cooler, and at the edges of the rubber resin 50, is the standard foil back insulation layers 14 and 16. The foil back insulation is disposed adjacent to the rubber resin, which bonds to the edges of the layer of fiberglass insulation.

The mesh 20 is shown disposed over both the foil backed fiberglass insulation and the rubber resin. The mesh is disposed over the entire roof apparatus, including about the outer periphery of the cooler 8. Finally, on top of, and impregnated in and below the mesh, is the sealer coating 36. It will be noted that the sealer coating 36 adjacent the cooler is thicker than the sealer coating over the foil and fiberglass insulation 16 and 14, respectively, so as to present a relatively even top surface for the roof apparatus 10. Obviously, the more even the top of the roof is, without low spots in which water may pool, the better the roof may drain. In actual construction, the top of mobile homes are either built at a slight angle from one side of the structure to the other so as to provide a roof with some pitch, however slight it may be, or the roof structure may be bowed slightly, with the top of the bow in about the longitudinal center of the mobile home. For convenience, the roof of the mobile home in the present application has been illustrated as being relatively flat.

The insulative roof apparatus illustrated and discussed herein is disposed on the top of the mobile home structure and thus prevents heat from entering the structure. The seal coating both seals the apparatus and reflects heat away from the apparatus. The various layers prevent heat not reflected from penetrating to the structure.

In the embodiment illustrated, the fiberglass insulation is shown extending to the edge of the roof (i.e., the juncture of the roof and the wall). If desired, the fiberglass 14 may stop beneath the upwardly extending flange 44 of the edge strip 40 with the foil 16 and the mesh or webbing 20 continuing to the edge beneath the flat outer flange 42. The foil contacts the edge gasket 52 to seal the fiberglass inwardly from the edge instead of at the edge. However, the sealer 36 should still be applied as illustrated. If desired, the foil may continue past the edge of the roof and may extend downwardly below the edge to provide more of a seal than is shown in FIG. 4, where the foil stops at the edge.

If the roof on which the insulation is disposed includes a slope, it may be desirable to have a slight depression about a cooler or other relatively large appliance or apparatus on the roof. As illustrated in FIG. 5, the thickness of the seal coating 36 over the rubber resin makes up for the difference between the fiberglass and the rubber resin. However, if there is sufficient slope to allow water to drain from the roof, the seal coating need not be so thick. The objective is sealing the roof, not rendering the roof flat and even. The accumulation or puddling of water on the roof is to be avoided. If such accumulation or puddling can be prevented without building up the thickness of the seal coating, then a slight depression may be acceptable.

While the principles of the invention have been made clear in illustrative embodiments, there will be immediately obvious to those skilled in the art many modifications of structure, arrangements, proportions, the elements, materials, and components used in the practice of the invention, and otherwise, which are particularly adapted for specific environments and operative requirements without departing from those principles. Moreover, the insulative roof apparatus may be applied over a composition or other roof, although only a sheet metal roof has been illustrated. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Insulative roof apparatus for mobile home buildings and the like, including structural members comprising, in combination:
    a base for the insulative roof apparatus comprising a structural roof of the building and including an outer periphery of the roof secured to outer peripheral structural members of the building;
    a flexible edge gasket disposed on the base at the outer periphery of the structural roof to provide a seal for the roof apparatus at the outer periphery of the building;
    an insulative layer disposed on the base;
    a foil layer disposed on the insulative layer;
    a mesh layer disposed over the foil layer;
    fastening means secured to outer peripheral structural members and to the edge gasket for fastening the insulative layer, the foil layer, and the mesh layer to the structural members of the building; and
    seal coat means disposed on the mesh and the fastening means for sealing the insulative roof apparatus to the building.

2. The apparatus of claim 1 in which the fastening means includes a plurality of bands extending across the building and secured to the outer peripheral structural members of the building.

3. The apparatus of claim 2 in which the fastening means further includes strip means secured to the outer periphery of the building beneath the seal coat means.

4. The apparatus of claim 3 in which the strip means includes an outer flange disposed on the edge gasket and an upwardly and inwardly extending inner flange.

* * * * *